United States Patent [19]

Rumps, Jr. et al.

[11] Patent Number: 4,937,771
[45] Date of Patent: Jun. 26, 1990

[54] DISKETTE DRIVE/STORAGE UNIT ASSEMBLY

[75] Inventors: Norbert A. Rumps, Jr., Arlington Heights; Mark T. Sodoma, Brookfield; Kiyoshi Suzuki, Chicago, all of Ill.

[73] Assignee: American Telephone and Telegraph Company, New York, N.Y.

[21] Appl. No.: 277,835

[22] Filed: Nov. 30, 1988

[51] Int. Cl.⁵ .............................................. G06F 11/00
[52] U.S. Cl. ...................................... 364/708; 364/900; 369/75.1; 361/380
[58] Field of Search .................... 364/200, 900, 708; 361/380, 392, 394, 331; 369/75.1

[56] References Cited

U.S. PATENT DOCUMENTS

| 4,421,977 | 12/1983 | Kittredge | 364/900 |
| 4,479,198 | 10/1984 | Romano et al. | 364/900 |
| 4,669,053 | 5/1987 | Krenz | 364/900 |

*Primary Examiner*—Gareth D. Shaw
*Assistant Examiner*—John G. Mills
*Attorney, Agent, or Firm*—A. A. Tirva

[57] ABSTRACT

A mounting arrangement for diskette drives in a cabinet of electronic apparatus includes an assembly for accommodating two diskette drives or one diskette drive and a removable diskette storage unit mounted in the space reserved for the second diskette drive. The assembly is adapted for quick and easy mount/dismount in and from the cabinet and the removable storage unit provides a convenient storage space for a number of often used diskettes in a space which is typically wasted until installation of a second diskette drive unit is required.

8 Claims, 3 Drawing Sheets

DISKETTE DRIVE/STORAGE UNIT ASSEMBLY

TECHNICAL FIELD

This invention relates to electronic apparatus such as a personal computer or the like and more particularly to electronic apparatus which incorporates one or more diskette drives.

BACKGROUND OF THE INVENTION

Personal computers, intelligent terminals, controllers, word processors and many other types of electronic products which incorporate a central processing unit may require one or more diskette drives. The function of a diskette drive is to transfer information from removable disks, called diskettes or floppy disks, to the memory of a processor or to store information received from the processor's memory. Generally, many of the above-identified products when sold are equipped with a single diskette drive, but almost all reserve space for a second diskette drive to be added sometime in the future. Mounting of the second diskette drive in the product already in the field is usually a time consuming and cumbersome procedure and space which eventually may be occupied by the second drive is usually not usable for any other purpose and thus is wasted.

Diskettes come in various sizes all the way from 8" down to 3½" in diameter. Typically operators of the equipment utilizing diskettes have a number of diskettes which they use repeatedly on a regular basis and thus like these diskettes to be conveniently located near the equipment. While stand alone storage units for diskettes are commercially available in various sizes and shapes, generally, operators do not have or do not want to take the time to put them in and take them out of these separate storage units and usually keep the diskettes on the surface supporting the equipment or on the equipment itself where the diskettes are likely to be damaged or easily mixed up with papers, etc. and thus difficult to locate when needed.

DISCLOSURE OF THE INVENTION

In accordance with the present invention, to overcome the foregoing disadvantages, we provide a mounting assembly for a diskette drive and a diskette storage unit, the assembly including an arrangement for quick mount/dismount of the assembly in a cabinet of electronic apparatus.

THE DRAWING

DETAILED DESCRIPTION

Figure 1:
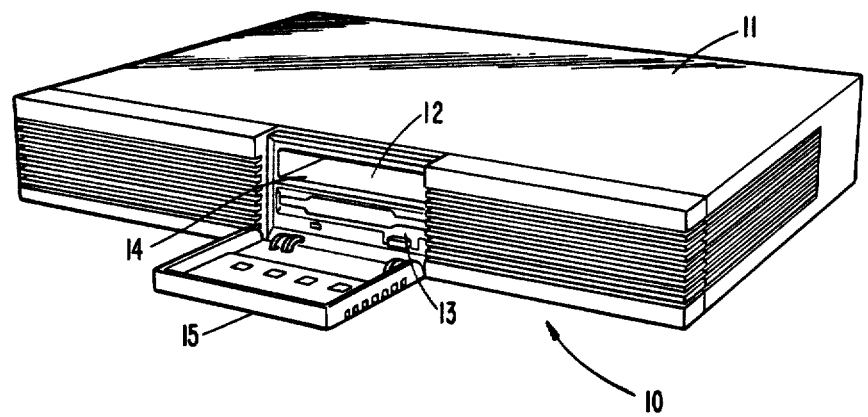
FIG. 1 is a perspective view of an electronic apparatus cabinet containing a diskette drive and storage compartment mounting assembly according to the present invention.

Referring now to FIG. 1, there is shown an electronic apparatus 10 enclosed in a cabinet 11 having an opening 12 which allows access to a diskette drive 13 and a diskette storage unit 14 both mounted inside the cabinet 11. The diskette drive 13 has a substantially rectangular shape with an opening in front for insertion of a diskette. The diskette storage unit 14 has a housing with a substantially rectangular shape with one end open such that several diskettes may be placed within the housing. The storage unit 14 may be manufactured by injection molding from a thermoplastic type of material. An access door 15, hinged at its base is furnished to close off the opening 12 when access to the diskette drive 13 and storage unit 14 is not required.

Figure 2:
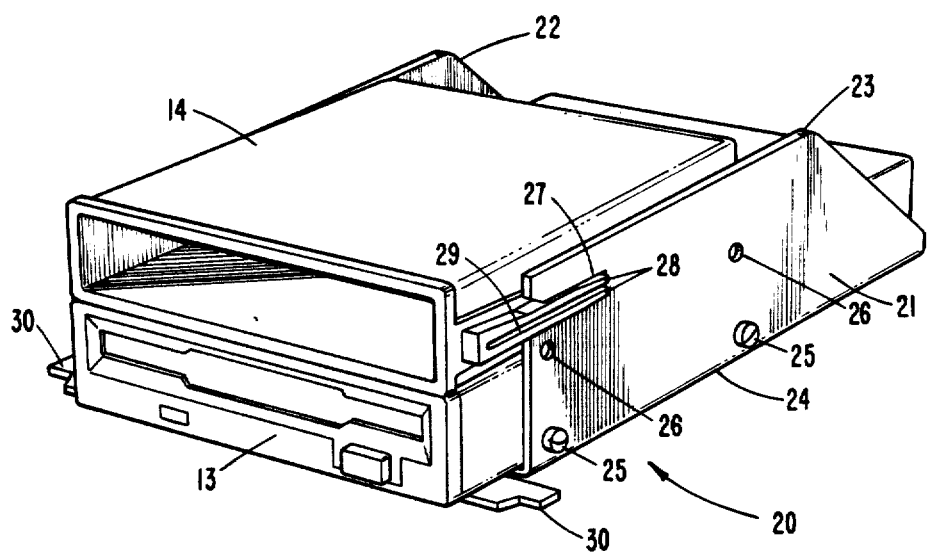
FIG. 2 is a perspective view of the assembly shown outside of the cabinet.

Referring now to FIG. 2, there is shown an assembly 20 consisting of a frame 21 having a U shape with vertical side walls 22 and 23 joined at the bottom by a base 24. The walls 22 and 23 are spaced apart such as to accommodate the diskette drive 13 which is placed inside the walls directly on the base 24 and is secured to the walls 22 and 23 by screws 25.

The frame 21 is arranged to accommodate a second diskette drive (not shown) at some future time. The second diskette drive when installed will be placed on top of the diskette drive 13 and attached to the side walls 22 and 23 in the same manner as the diskette drive 13 by screws 25 passing through openings 26 (FIGS. 2 and 3) in the side walls 22 and 23.

To utilize the wasted space which is reserved for the second diskette drive and to provide storage for several of the often used diskettes, the storage unit 14 is mounted in the space above the diskette drive 13. The mounting of the storage unit 14 is accomplished as follows. The frame 21 has rectangular slots 27 (FIGS. 2 and 3) extending partially the length of each side wall 22 and 23. The storage unit 14 has extending along both of its sides parallel to its longitudinal axis a pair of bifurcated fingers 28 (FIGS. 2 and 3) with a space 29 separating the two fingers. The fingers 28 are tapered at their ends enabling them to enter slots 27. Once the fingers 28 enter slots 27 located in side walls 22 and 23, a force is applied to the storage unit 14 to force the fingers 28 into the slots 27 wedging the fingers in the slots 27 and thereby locking the storage unit 14 in place. To remove the storage unit 14 from the assembly, a force is applied to dislodge the fingers 28 from the slots 27.

Figure 3:
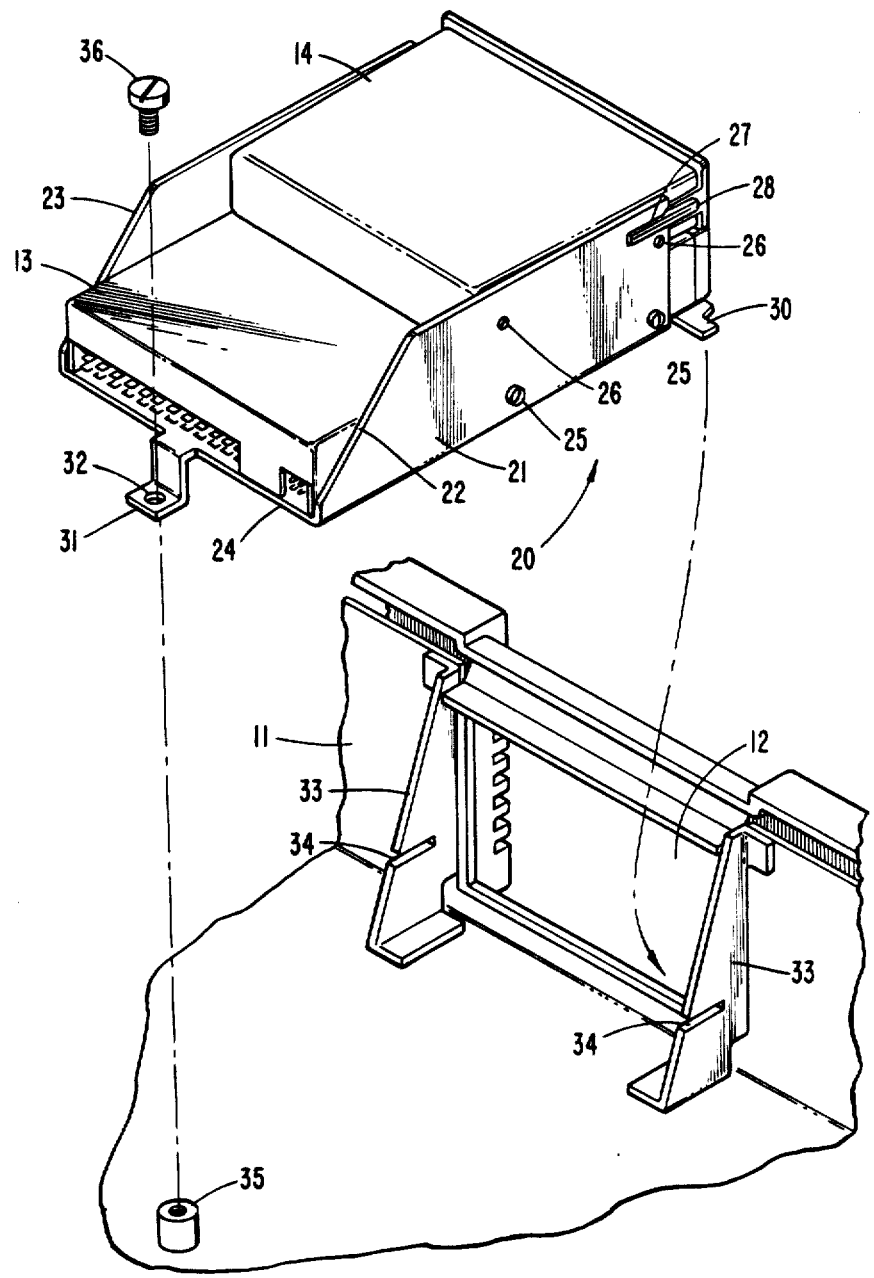
FIG. 3 is a perspective, partially exploded view of the arrangement for mounting of the assembly, shown in FIG. 2, into the cabinet.
Figure 4:
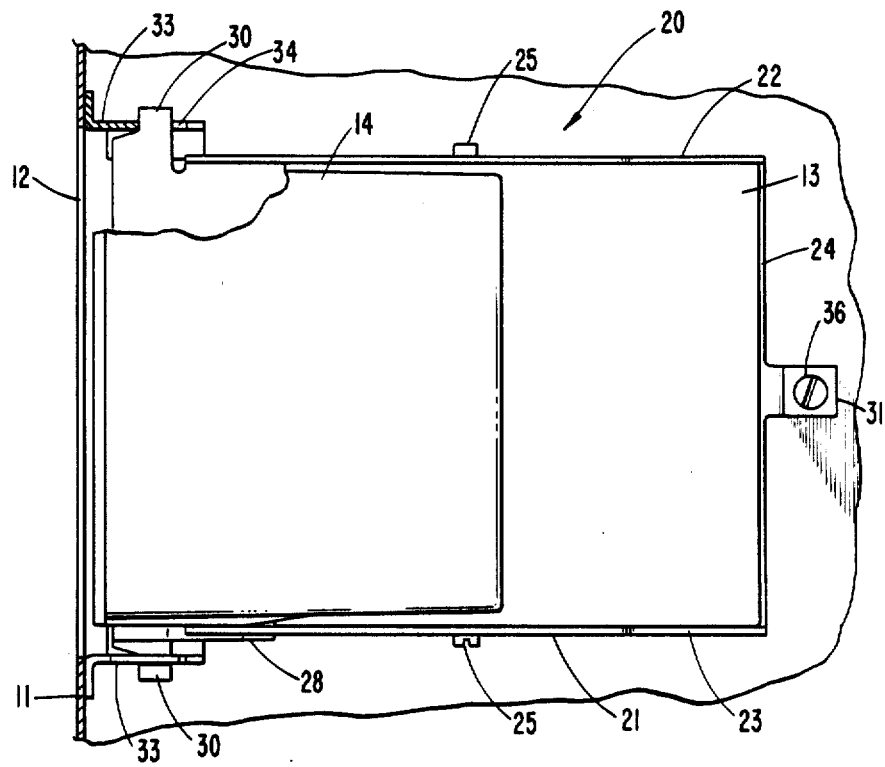
FIG. 4 is a partial top view of the assembly mounted in the cabinet with the top of the cabinet removed.
Figure 5:
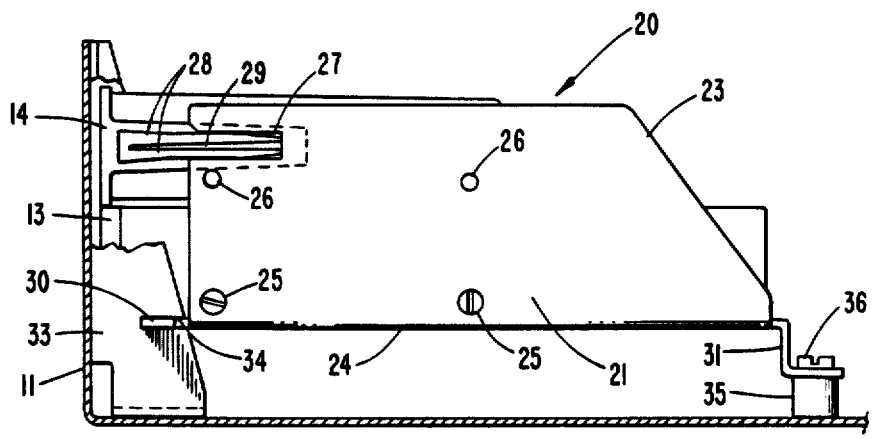
FIG. 5 is a partial left plan view of the assembly shown in FIG. 4.

Referring now to FIG. 3, there is shown an arrangement which provides a quick mount/dismount of the assembly 20 to and from the cabinet 11. At one end of the frame 21, it has extending from the sides of base 24 and substantially parallel to the base, tabs 31 (shown in FIG. 2). At the other end of the frame 21, it has extenting from the base 24 and having a substantially squared-off S shape, a tab 31. The top portion of the S is connected to the base 24 and the bottom portion of the S has an aperture 32.

A pair of brackets 33, each located on opposite sides of opening 12 in the cabinet 11, has a slot 34 extending partially therethrough parallel to the base of the cabinet 11. Slots 34 are arranged to slidably accommodate tabs 30 of the bracket 21. A standoff 35 projecting from the base of the cabinet 11 is arranged to support the bottom portion of the S-shaped tab 31. The height of the standoff 35 is such that the base 24 of the assembly 20 is supported substantially parallel to the base of the cabinet 11 when the tabs 30 are located within the slots 34. A fastener 36 passing through opening 32 in tab 31 is driven into the standoff 35 securing the frame 21 and thus the assembly 20 to the cabinet 11. To remove assembly 20 from the cabinet 11, all that is needed is removal of the fastener 36 at which time assembly 20 may be moved back such that tabs 30 exit from slots 34 allowing assembly 20 to be lifted from the cabinet 11.

We claim:

1. A diskette drive mounting assembly for mounting in a cabinet of a personal computer or the like said cabinet having an opening allowing access to said assembly, the assembly comprising:
    a U-shaped frame having two substantially parallel side walls and a base joining said walls;
    a diskette drive positioned between the walls on the base of the frame;
    means for securing the diskette drive to said frame;
    means for storing diskettes positioned between the side walls of the frame and above the diskette drive;
    means for securing the storage means to said frame; and
    means for mounting said assembly in the cabinet.

2. A diskette drive mounting assembly in accordance with claim 1 wherein the securing means for the diskette drive includes at least two fasteners to attach the diskette drive to both side walls of the frame.

3. A diskette drive mounting assembly in accordance with claim 1 wherein the storage means for the diskettes comprises a substantially rectangular housing having an opening at one end.

4. A diskette drive mounting assembly in accordance with claim 3 wherein the housing is molded from a thermoplastic type of material.

5. A diskette drive mounting assembly in accordance with claim 4 wherein the means for securing the housing includes a pair of bifurcated fingers extending a predetermined distance along each side of the housing from the open end of the housing towards the opposite end of the housing having a predetermined taper and substantially parallel to the longitudinal axis of the housing.

6. A diskette drive mounting assembly in accordance with claim 5 wherein the securing means for the housing further includes a pair of rectangular shaped slots located in said side walls of the frame, each slot arranged to accommodate a pair of bifurcated fingers located on the housing such that each pair of bifurcated fingers is wedged in its respective slot locking the housing to the frame.

7. A diskette drive mounting assembly in accordance with claim 1, wherein the mounting means for the assembly comprises:
    a pair of tabs each extending from two opposite sides of the base of the frame at one end of the frame, the tabs being substantially parallel to said base;
    a tab having a substantially squared-off S shape extending from the base at the other end of the frame, the top portion of the S extending from the base of the frame and substantially parallel to the base, the bottom portion of the S being substantially parallel to the top portion;
    a pair of brackets located in the cabinet at opposite sides of the access opening in the cabinet, each bracket having a slot extending partially therethrough and substantially parallel to the base of the cabinet arranged to slidably accommodate one of the pair of tabs extending from the base, the brackets being spaced apart so as to accommodate the assembly between them; and
    means for securing the S shaped tab to the cabinet.

8. A diskette drive mounting assembly in accordance with claim 7, wherein the securing means for the S shaped tab comprises:
    the bottom portion of the S shaped tab having an aperture therein;
    a stand-off projecting from the base of the cabinet arranged to support the bottom portion of the S shaped tab, the projection being of a predetermined height such as to support the base of the assembly substantially parallel to the base of the cabinet; and
    means for securing the bottom portion of the S-shaped tab to the stand-off.

* * * * *